United States Patent
Inoue (10) Patent No.: US 8,352,974 B2
(45) Date of Patent: Jan. 8, 2013

(54) DISK HOLDING DEVICE AND DISK PROCESSOR FOR A DISK HAVING A CENTER HOLE

(75) Inventor: Satoru Inoue, Musashino (JP)

(73) Assignee: TEAC Corporation, Tokyo (JP)

( * ) Notice: Subject to any disclaimer, the term of this patent is extended or adjusted under 35 U.S.C. 154(b) by 555 days.

(21) Appl. No.: 12/622,376

(22) Filed: Nov. 19, 2009

(65) Prior Publication Data

US 2010/0125863 A1 May 20, 2010

(30) Foreign Application Priority Data

Nov. 19, 2008 (JP) ................................. 2008-295706

(51) Int. Cl.
*G11B 17/022* (2006.01)
*G11B 17/053* (2006.01)
(52) U.S. Cl. .................... 720/704; 720/614; 720/707
(58) Field of Classification Search .................. 720/600, 720/601, 604, 605, 615, 616, 652, 695, 703–717; 101/40; 347/104
See application file for complete search history.

(56) References Cited

U.S. PATENT DOCUMENTS

| | | | |
|---|---|---|---|
| 5,584,638 A | 12/1996 | Delaney | |
| 7,360,225 B2 * | 4/2008 | Shiaku | 720/606 |
| 7,487,517 B2 * | 2/2009 | Lee et al. | 720/601 |
| 7,540,237 B2 * | 6/2009 | Kubin et al. | 720/619 |
| 2007/0267881 A1 | 11/2007 | Arai | |
| 2008/0250437 A1 * | 10/2008 | Honma | 720/601 |

FOREIGN PATENT DOCUMENTS

| | | |
|---|---|---|
| JP | 2002-052488 A | 2/2002 |
| JP | 2007-234128 | 9/2007 |
| JP | 2007-310920 A | 11/2007 |
| JP | 2008-257807 | 10/2008 |

OTHER PUBLICATIONS

Japanese Office Action, dated May 25, 2012, for corresponding JP Application No. 2008-295706, with English translation, 6 Pages.

* cited by examiner

*Primary Examiner* — Nathan Danielsen
(74) *Attorney, Agent, or Firm* — Seed IP Law Group PLLC (57) ABSTRACT

A disk holding device is for use with a disk having a center hole. A disk holding mechanism with coupling levers is movable between a holding position and a release position, for engagement with an edge of the center hole when in the holding position, and for coming away from the edge when in the release position. A solenoid shifts the disk holding mechanism, to hold the disk by setting the disk holding mechanism in the holding position, and to enable loading or unloading of the disk by setting the disk holding mechanism in the release position. A separating projection is opposed to the edge when inserted in the center hole, for receiving the edge while the disk holding mechanism moves to the release position, to ensure separation of the disk from the disk holding mechanism.

9 Claims, 13 Drawing Sheets

FIG. 14

DISK HOLDING DEVICE AND DISK PROCESSOR FOR A DISK HAVING A CENTER HOLE

BACKGROUND OF THE INVENTION

1. Field of the Invention

The present invention relates to a disk holding device and disk processor. More particularly, the present invention relates to a disk holding device for holding a disk and capable of reliably releasing the disk from holding, and a disk processor.

2. Description Related to the Prior Art

A disk processor is known and commercially marketed in the field of instruments for data recording. The disk processor includes a data writer for writing data to a great number of disks, such as CDs and DVDs, and also includes a label printer for printing a label on each of the disks. An unprocessed disk storage unit is included in the disk processor for stacking unprocessed disk. A disk holding device or disk holding arm takes up disks one after another. Each disk is moved to the data writer, transferred from the data writer to the label printer, and transferred from the label printer to a processed disk storage unit.

The disk holding device includes coupling levers or disk holding levers for holding a disk. There is a center hole in a disk. The coupling levers are entered in and engaged with the center hole for holding. There have been various suggested structures of the coupling levers for the purpose of exactly holding each one of disks in a discrete manner.

U.S. Pat. Pub. No. 2007/0267881 (corresponding to JP-A 2007-310920) discloses a set of three coupling levers insertable in the center hole of a disk for contacting an edge surface of the center hole. Among the coupling levers, two have a contact surface for contacting the edge surface of the center hole. The contact surface has a size greater than a thickness of the disk. A remaining one of the coupling levers has a contact surface for contacting the edge surface of the center hole, the contact surface has a size smaller than the thickness of the disk. This is for the purpose of avoiding simultaneous holding of two disks.

JP-A 2002-052488 discloses a disk holding structure including a stationary portion and the coupling levers. The stationary portion is entered in the center hole for contacting the edge surface thereof. Also, a first one of the coupling levers in a straight form contacts the edge surface of the center hole. An uppermost one of disks is held and moved up by the stationary portion and the first coupling lever. Then a second one of the coupling levers having a V-shaped end is inserted in the center hole, is shifted to push the edge surface of the center hole. Thus, the disk can be held in a stable manner.

While a disk is held, the coupling levers press the edge surface of the center hole. At least the first coupling lever, which has the size greater than the disk thickness, contacts a lower surface of the disk. If the first coupling lever is shifted in an inward direction to release holding, the disk is separated by its weight from a second one of the coupling levers without contacting the lower surface. However, the disk remains in contact with the second in a coupled state, so that the disk starts becoming skewed. Then the disk becomes disengaged from the second coupling lever in occurrence of the skew, and drops down in the skewed state. There arises a problem in failure of normally transferring into the processed disk storage unit.

SUMMARY OF THE INVENTION

In view of the foregoing problems, an object of the present invention is to provide a disk holding device for holding a disk and capable of reliably releasing the disk from holding, and a disk processor.

In order to achieve the above and other objects and advantages of this invention, a disk holding device for a disk having a center hole is provided, and includes a disk holding mechanism, movable between a holding position and a release position, for engagement with an edge of the center hole when in the holding position, and for coming away from the edge when in the release position. An actuating mechanism shifts the disk holding mechanism, to hold the disk by setting the disk holding mechanism in the holding position, and to enable loading or unloading of the disk by setting the disk holding mechanism in the release position. A separator is opposed to the edge when inserted in the center hole, for receiving the edge while the disk holding mechanism moves to the release position, to ensure separation of the disk from the disk holding mechanism.

The disk holding mechanism includes a shank portion for insertion in the center hole. A hook portion is disposed to project from the shank portion, for engagement with the edge of the center hole.

The disk holding mechanism holds the disk oriented in a downward direction, the hook portion is positioned eccentrically with reference to the center hole, and the separator is close to the hook portion.

Furthermore, a disk storage unit contains the disk in a stacked manner. A moving mechanism moves the disk holding mechanism at least in an upward or downward direction, to remove the disk from the disk storage unit by one disk.

The disk holding mechanism includes at least first, second and third coupling levers arranged at a predetermined interval along the edge of the center hole, each of the first, second and third coupling levers having the shank portion. The hook portion is formed with each of the first and second coupling levers.

Furthermore, a transfer arm supports the disk holding mechanism and moves by operation of the moving mechanism. Each of the first, second and third coupling levers includes a lever arm, disposed to project from an edge of the shank portion, and secured to the transfer arm in a rotatable manner.

The actuating mechanism includes an electromagnetic actuator. A rotating plate is secured to an end of the lever arm, rotated by the actuator, for shifting the first, second and third coupling levers between the holding position and the release position.

Furthermore, a holding ring portion has an annular shape, is disposed to project from a lower wall of the disk holding mechanism, for contacting a portion of the disk about the center hole. The separator is a separating projection disposed to project from an inner edge of the holding ring portion.

Furthermore, an access opening is formed in a lower wall of the transfer arm, opposed to the center hole, for receiving insertion of the shank portion of the first, second and third coupling levers.

In a preferred embodiment, a disk processor for a disk having a center hole is provided. A disk holding mechanism is movable between a holding position and a release position, engaged with an edge of the center hole when in the holding position, and disengaged from the edge in an inward direction thereof when in the release position. An actuating mechanism shifts the disk holding mechanism, to hold the disk by setting the disk holding mechanism in the holding position, and to enable loading or unloading of the disk by setting the disk holding mechanism in the release position. A separator is opposed to the edge when inserted in the center hole, for preventing the edge of the center hole from moving together with the disk holding mechanism while the disk holding mechanism moves to the release position, to ensure separation of the disk from the disk holding mechanism. A transfer arm supports the disk holding mechanism, the actuating mechanism and the separator. A disk storage unit contains an unprocessed disk. A disk processing unit processes the unprocessed disk in at least one of data writing and label printing. A processed disk storage unit contains the processed disk. A moving mechanism moves the transfer arm at least in an upward or downward direction, to transfer the unprocessed disk from the disk storage unit to the disk processing unit, and to transfer the processed disk from the disk processing unit to the processed disk storage unit.

Consequently, a disk can be released reliably from holding, because the separator can separate the disk from the disk holding mechanism.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
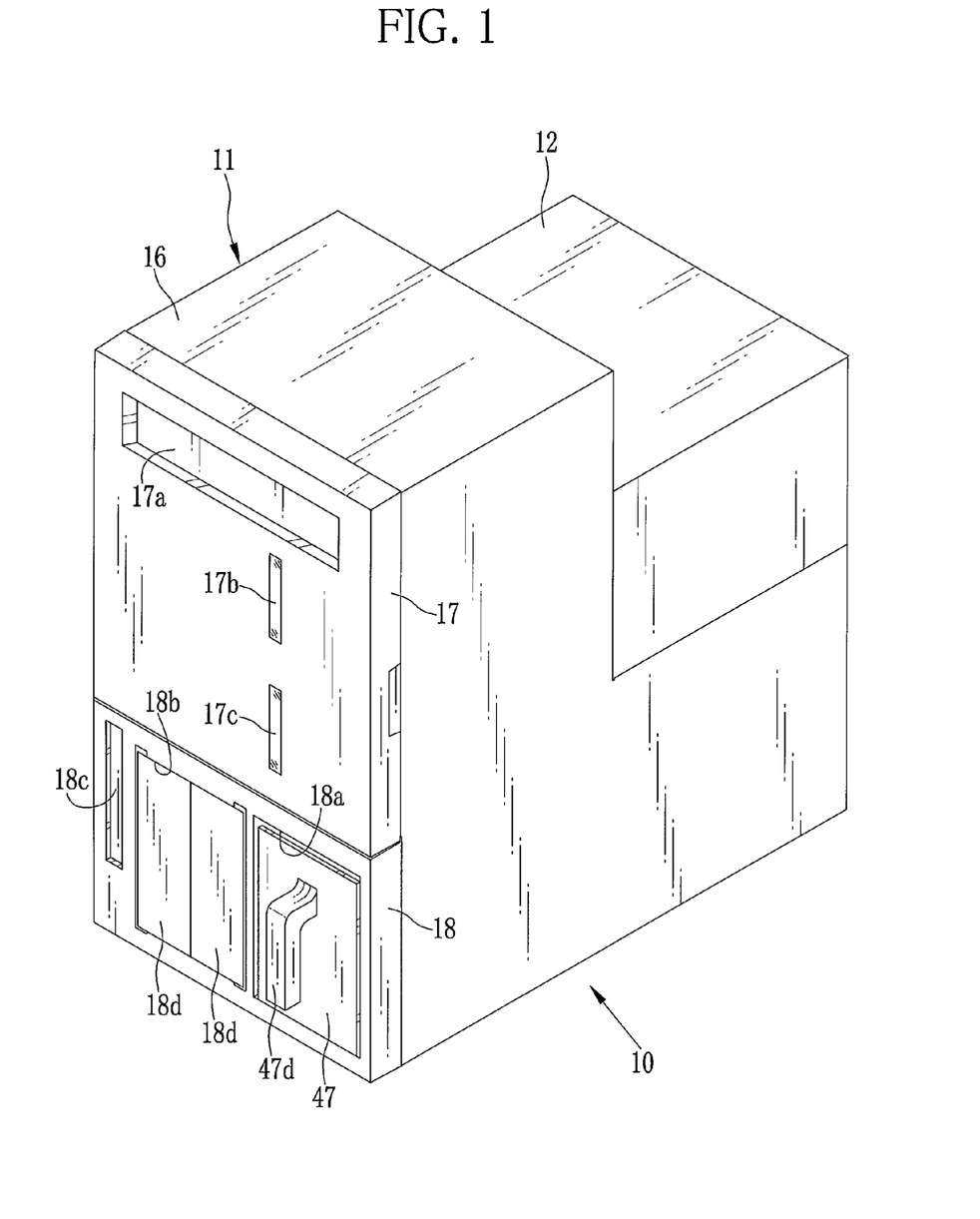
FIG. 1 is a perspective view illustrating a disk processor.

In FIG. 1, a disk processor 10 includes an apparatus body 11 and a label printer 12 as a disk processing unit. The apparatus body 11 has an L shape as viewed laterally. There is an upper surface of a rear cutout in the apparatus body 11. The label printer 12 is mounted on the upper surface for attachment. The label printer 12 is removable from the apparatus body 11. A separate form of the apparatus body 11 constitutes a data writer as a disk processor without label printing function.

Figure 2:
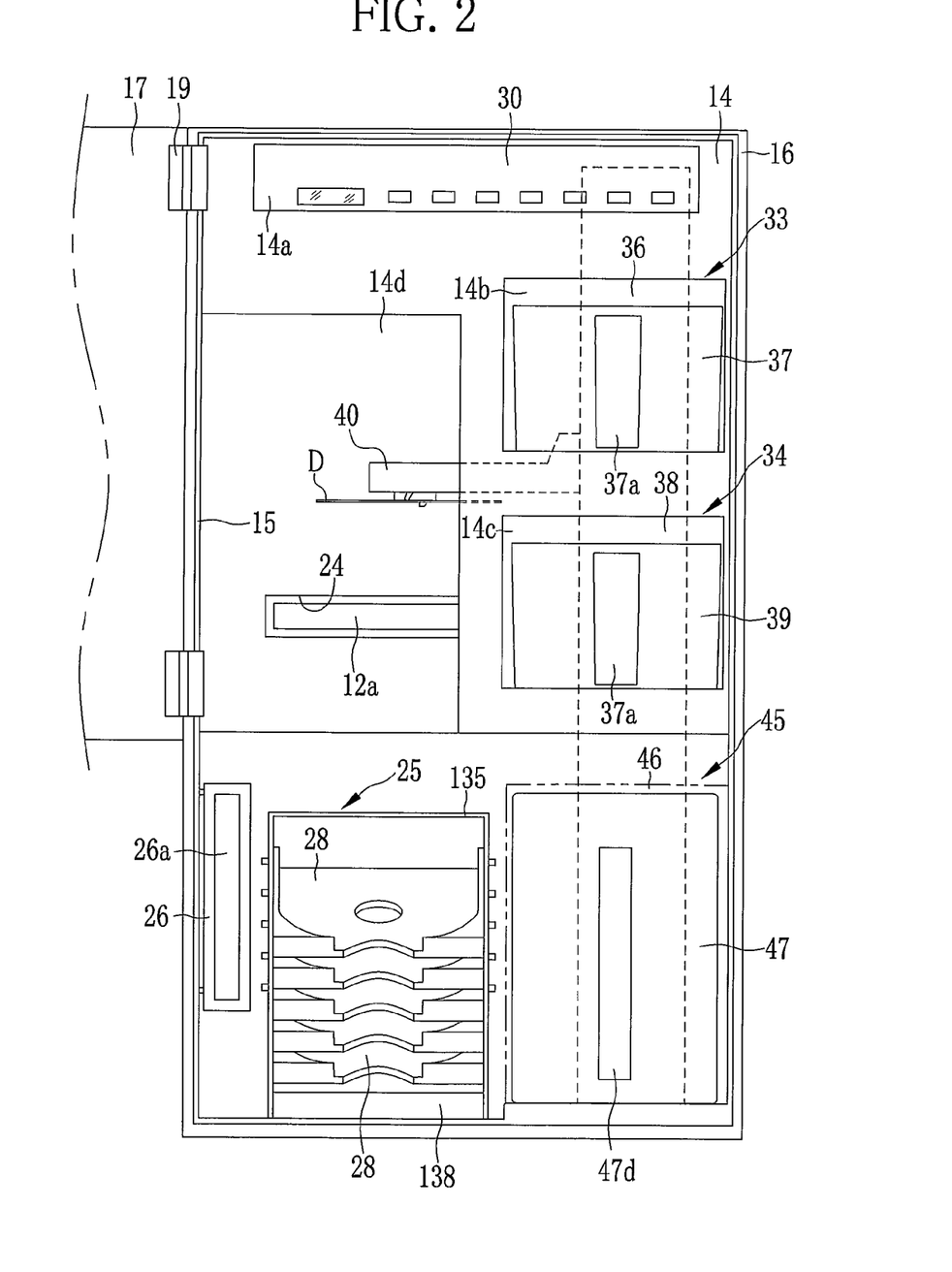
FIG. 2 is an explanatory view in a perspective illustrating elements in the disk processor shown by removing upper and lower panels.

In FIG. 2, the apparatus body 11 includes a frame 15, a casing 16, an upper panel 17 and a lower panel 18. The casing 16 covers the frame 15. The upper and lower panels 17 and 18 are attached to the frame 15 and cover the front of the casing 16. A hinge mechanism 19 secures the upper panel 17 to the frame 15 in an openable manner. The upper panel 17 covers an upper half of the front of the casing 16. A retaining device with claws secures the lower panel 18 to the frame 15 in a removable manner. The lower panel 18 covers a lower half of the front of the casing 16.

Figure 3:
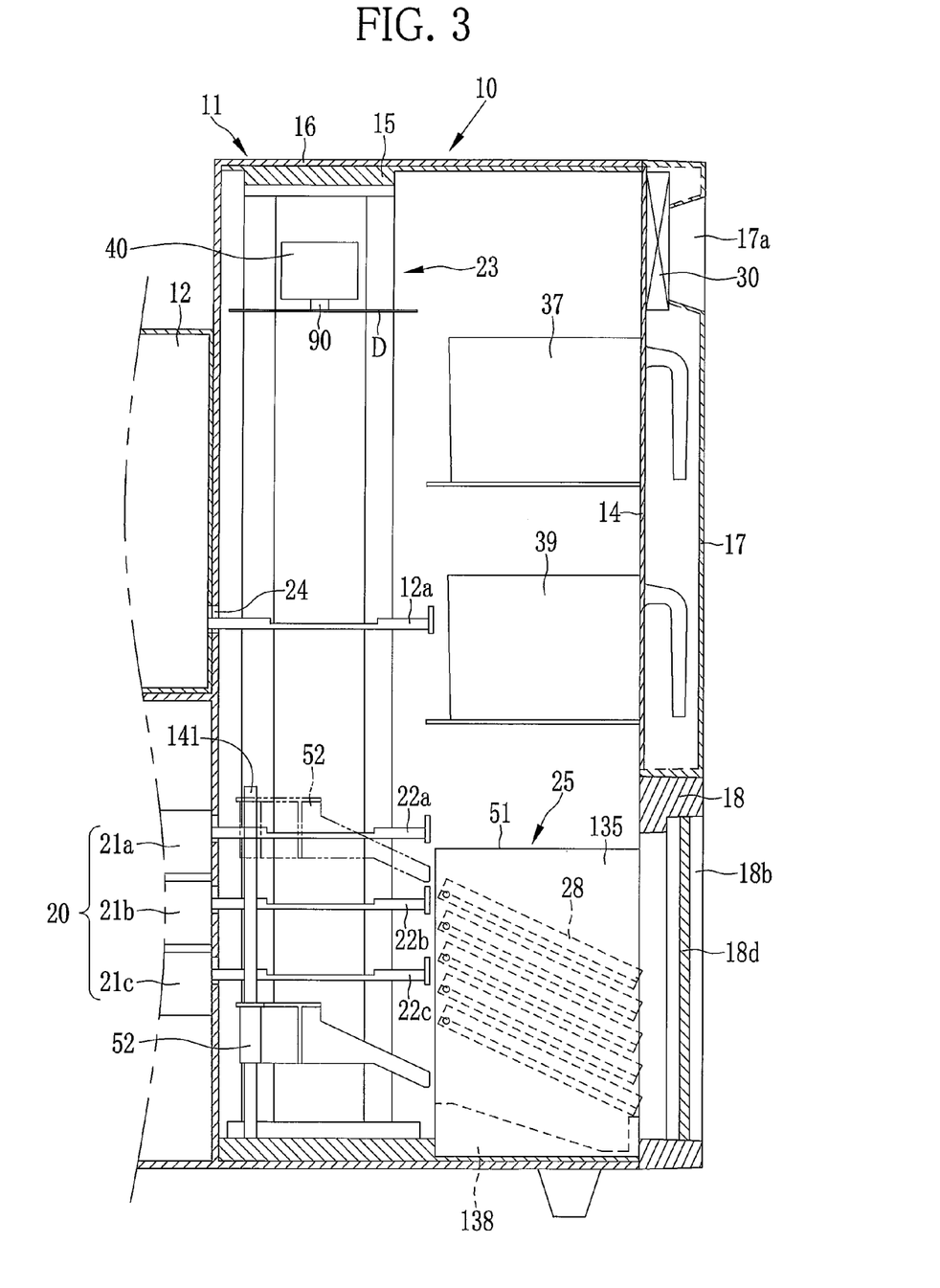
FIG. 3 is an explanatory view in a vertical section illustrating the disk processor.

In FIGS. 2 and 3, the apparatus body 11 contains a data writer 20 as a disk processing unit, a disk moving assembly 23, a disk sorter 25, and a controller 27 (See FIG. 4) for control of those various elements. A tray opening 24 is formed in a rear wall of the casing 16. A tray 12a of the label printer 12 moves in and out through the tray opening 24.

The label printer 12 is constituted by a thermal transfer type of printer or the like known in the art. The tray 12a on the front side is opened and closed horizontally, and when in the open position, is supplied with a disk D, and then shifted to the closed position automatically. The disk D is loaded in the label printer 12 for label printing of an image on a labeling surface, such as a low-resolution image, logo, pattern, and the like. After the label printing, the tray 12a moves to the open position for allowing takeout of the disk D as a printed article.

The data writer 20 is constituted by a plurality of DVD write heads 21a-21c for applying laser light to a recording surface of a disk D to write data as well-known in the art. Trays 22a-22c are disposed in respectively front sides of the DVD write heads 21a-21c, and are shifted horizontally for opening and closing. An unprocessed disk D is placed on each of the trays 22a-22c in an open position before the designated one of the trays 22a-22c is shifted to a closed position. Data is written to the disk D set in the closed position. Upon terminating the data writing, each of the trays 22a-22c moves to the open position.

In general, time of data writing of the data writer 20 for one disk is considerably longer than time of label printing of the label printer 12 for one disk. In view of this, the DVD write heads 21a-21c are three even for the single label printer, to raise efficiency by simultaneous data writing.

When the trays 12a and 22a-22c of the label printer 12 and the DVD write heads 21a-21c are set in the open position, a center point of a disk D on the tray 12a and a center point of a disk D on any of the trays 22a-22c are aligned on one vertical line or chute position.

In FIG. 1, an opening 17a and transparent windows 17b and 17c are disposed in the upper panel 17. An input panel 30 of FIG. 2 is disposed on the upper panel 17 and appears in the opening 17a. In FIG. 2, an intermediate panel 14 is secured to the frame 15. Openings 14a, 14b, 14c and 14d are formed in the intermediate panel 14. The opening 14a is positioned to correspond to the opening 17a of the upper panel 17. The input panel 30 is fitted in the opening 14a. A connector (not shown) is disposed on a rear wall of the apparatus body 11. The connector is connectable with a LAN cable or other cable, and transmits data to the controller 27, the data including data from the personal computer (PC), data for label printing, and the like. Various switches are included in the input panel 30, such as a power switch, power source lamp and the like for plural purposes. A display window is disposed in the input panel 30 for displaying a condition of processing in the disk processor 10.

The openings 14b and 14c are formed in a portion of the intermediate panel 14 on a right side, and correspond to respectively the transparent windows 17b and 17c. A first disk storage unit 33 and a second disk storage unit 34 are arranged in the openings 14b and 14c in a form of two tiers. The opening 14d is openable for the purpose of maintenance.

The first disk storage unit 33 contains unprocessed DVD disks before data writing or printing, and includes a receiving chamber 36 and a first disk stacker 37. The receiving chamber 36 is formed with the frame 15. The first disk stacker 37 is contained in the receiving chamber 36 in a manner movable out. The first disk stacker 37 is a case having an open end at its top. A grip 37a is formed with the first disk stacker 37 for use in moving into and out of the receiving chamber 36. Plural unprocessed disks D, for example 50, are stacked and contained in the first disk stacker 37. The second disk storage unit 34 is constructed similarly to the first disk storage unit 33, and includes a receiving chamber 38 and a second disk stacker 39. Openings for transfer of disks are formed in rear wall of the first and second disk stackers 37 and 39.

In FIG. 1, openings 18a, 18b and 18c are formed in the lower panel 18. The opening 18a is located in the lower panel 18 on the right side. In FIG. 2, a third disk storage unit 45 or processed disk storage unit is disposed in the frame 15 and positioned at the opening 18a. The third disk storage unit 45 has a receiving chamber 46 and a third disk stacker 47 contained in the receiving chamber 46.

Figure 5:
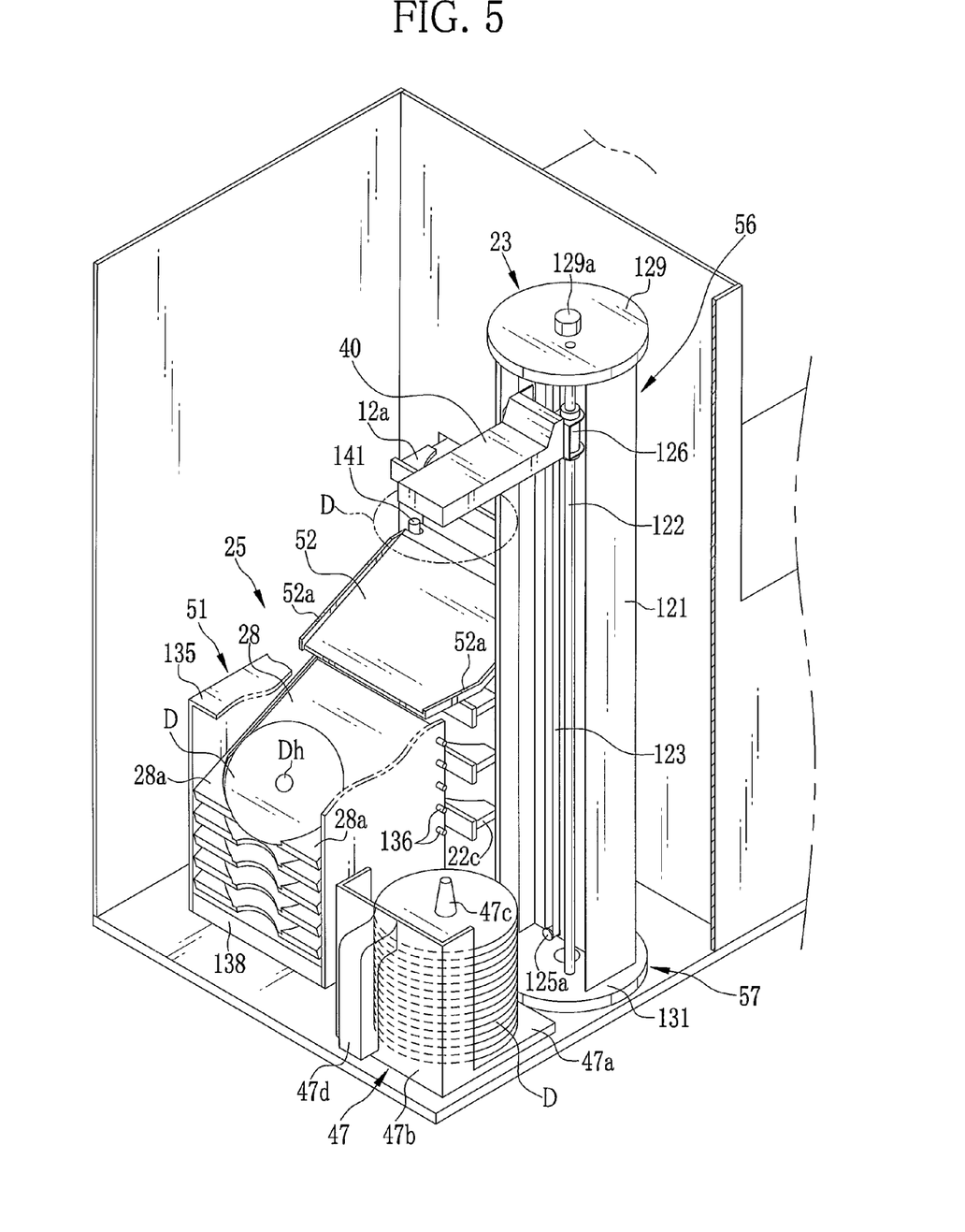
FIG. 5 is a perspective view illustrating a disk moving assembly, a tray and a third disk stacker.

In FIG. 5, a stack of processed disks D are contained in the third disk stacker 47. The third disk stacker 47 includes a lower wall 47a, a front wall 47b and a guide rod 47c. The guide rod 47c is disposed on a center of the lower wall 47a and extends vertically. The guide rod 47c is so long as to receive 100 disks D by entry of its rod portion in their center hole. The lower wall 47a and the front wall 47b are formed from transparent plastic material, through which the stacked disks D are externally visible. The front wall 47b is positioned to cover the opening 18a when the third disk stacker 47 is entered in the receiving chamber 46. A grip 47d is formed with the front wall 47b.

In FIG. 1, the opening 18b is formed in a portion on the left of the opening 18a. In FIG. 2, the disk sorter 25 for disk discharge is secured to the frame 15 in a position of the opening 18b. Each of sorting trays 28 appears through the opening 18b. In FIG. 3, the disk sorter 25 includes a sorter body 51 or tray tower, and a movable chute structure 52 or ramp structure. A pair of openable doors 18d of a type of a double swinging door are secured to the opening 18b, and are opened to take out the disk D through the sorting trays 28 for use.

In FIG. 2, a DVD player/recorder 26 of the disk processor 10 is secured to the frame 15 and positioned at the opening 18c. A tray 26a is movable into and out of the opening 18c.

Figure 6:
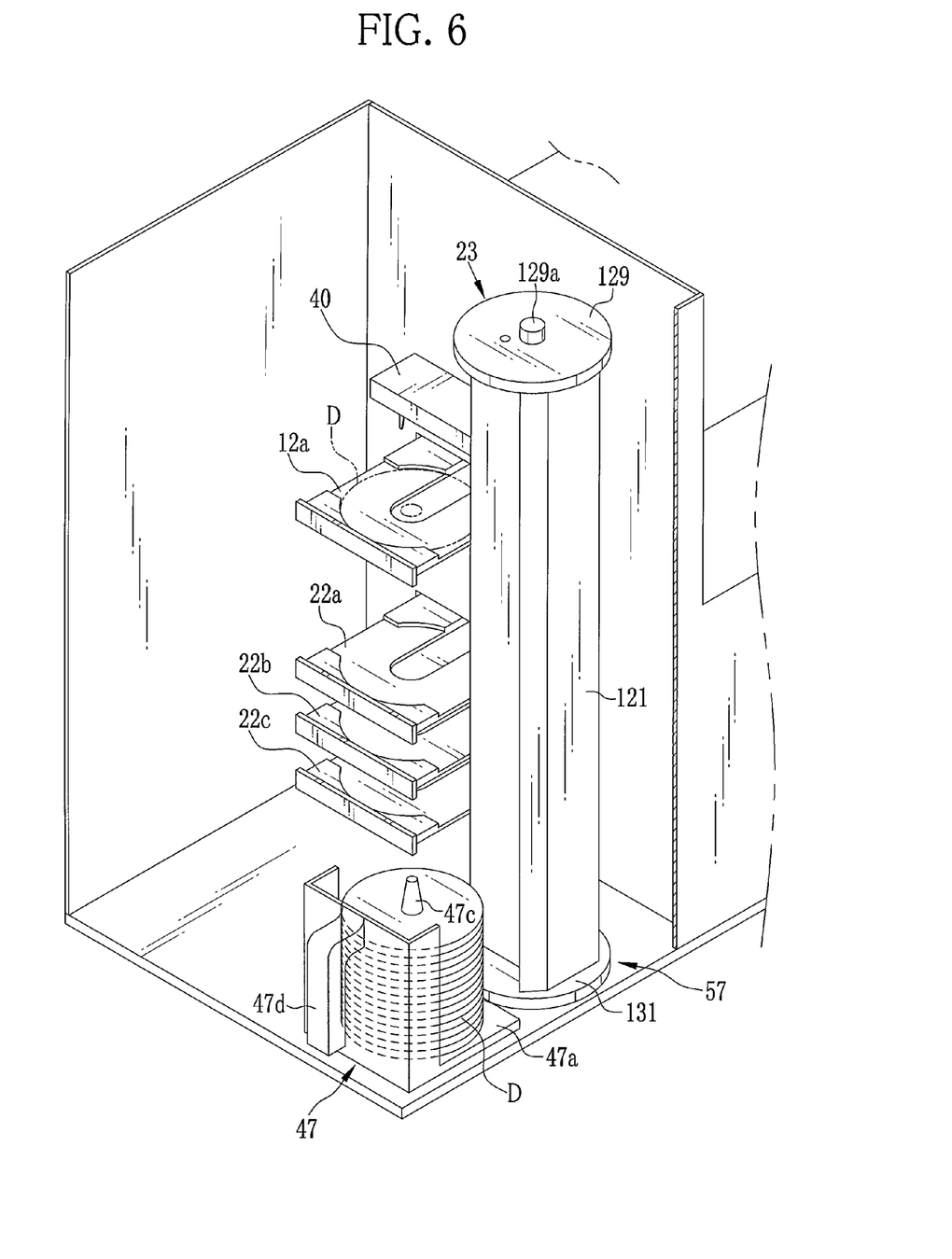
FIG. 6 is a perspective view illustrating the same as FIG. 5 but in a chute position.
Figure 7:
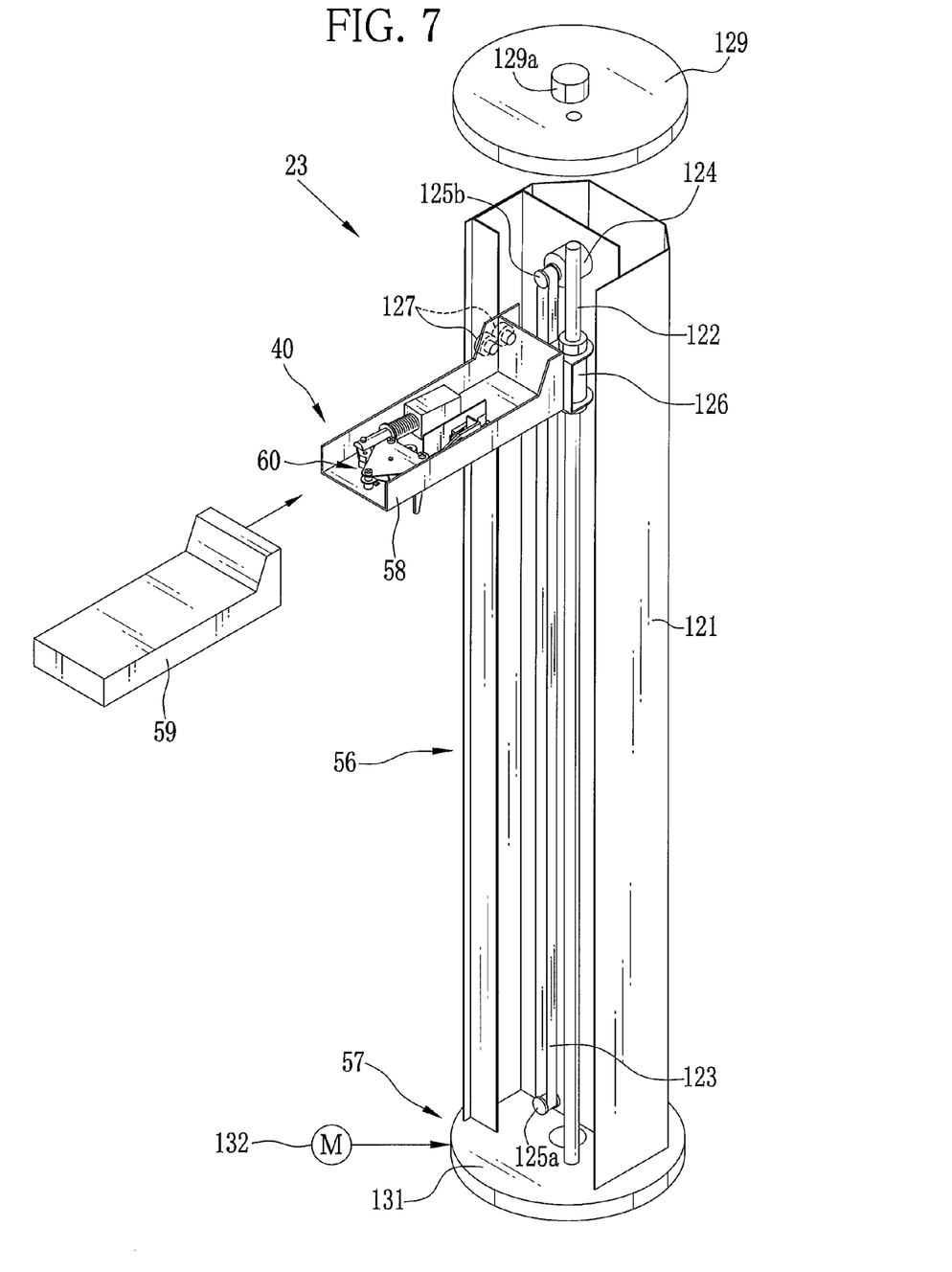
FIG. 7 is a perspective view illustrating the disk moving assembly.

In FIGS. 5, 6 and 7, the disk moving assembly 23 includes a disk holding device 40 or disk transfer device in an arm form, a moving mechanism 56 or lifting mechanism and a rotating device 57 or shifting device. The moving mechanism 56 moves up and down the disk holding device 40. The rotating device 57 rotates the moving mechanism 56 between angular positions of FIGS. 5 and 6.

In FIG. 7, the disk holding device 40 includes a transfer arm 58 or carriage, an arm cover 59, and a disk holding mechanism 60. The transfer arm 58 has a U shape as viewed in a cross section. The arm cover 59 covers the top of the transfer arm 58. The disk holding mechanism 60 is a holding chuck or shaft mechanism disposed at an end of the transfer arm 58.

Figure 8:
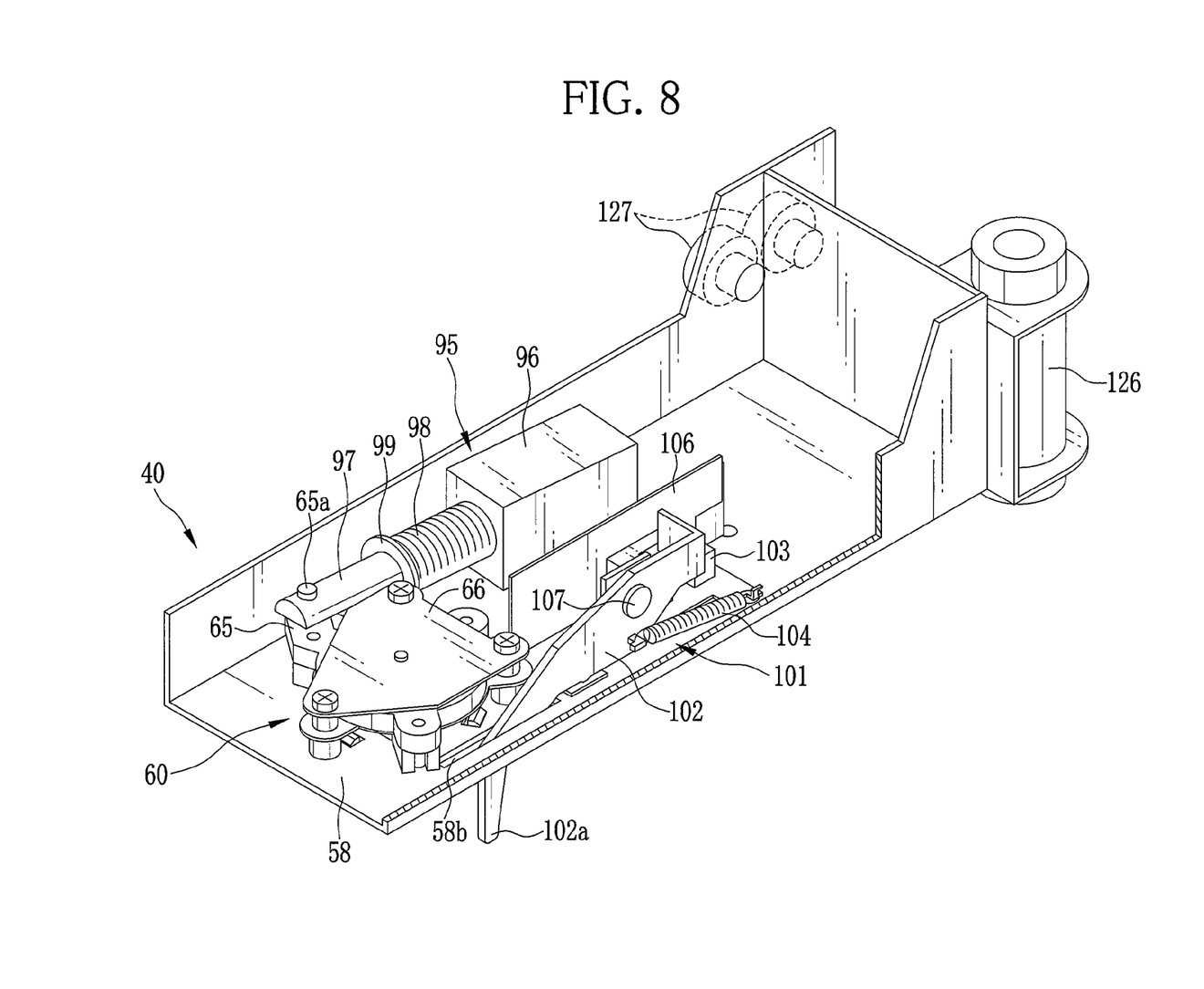
FIG. 8 is a perspective view partially cutaway illustrating the inside of a transfer arm.
Figure 9:
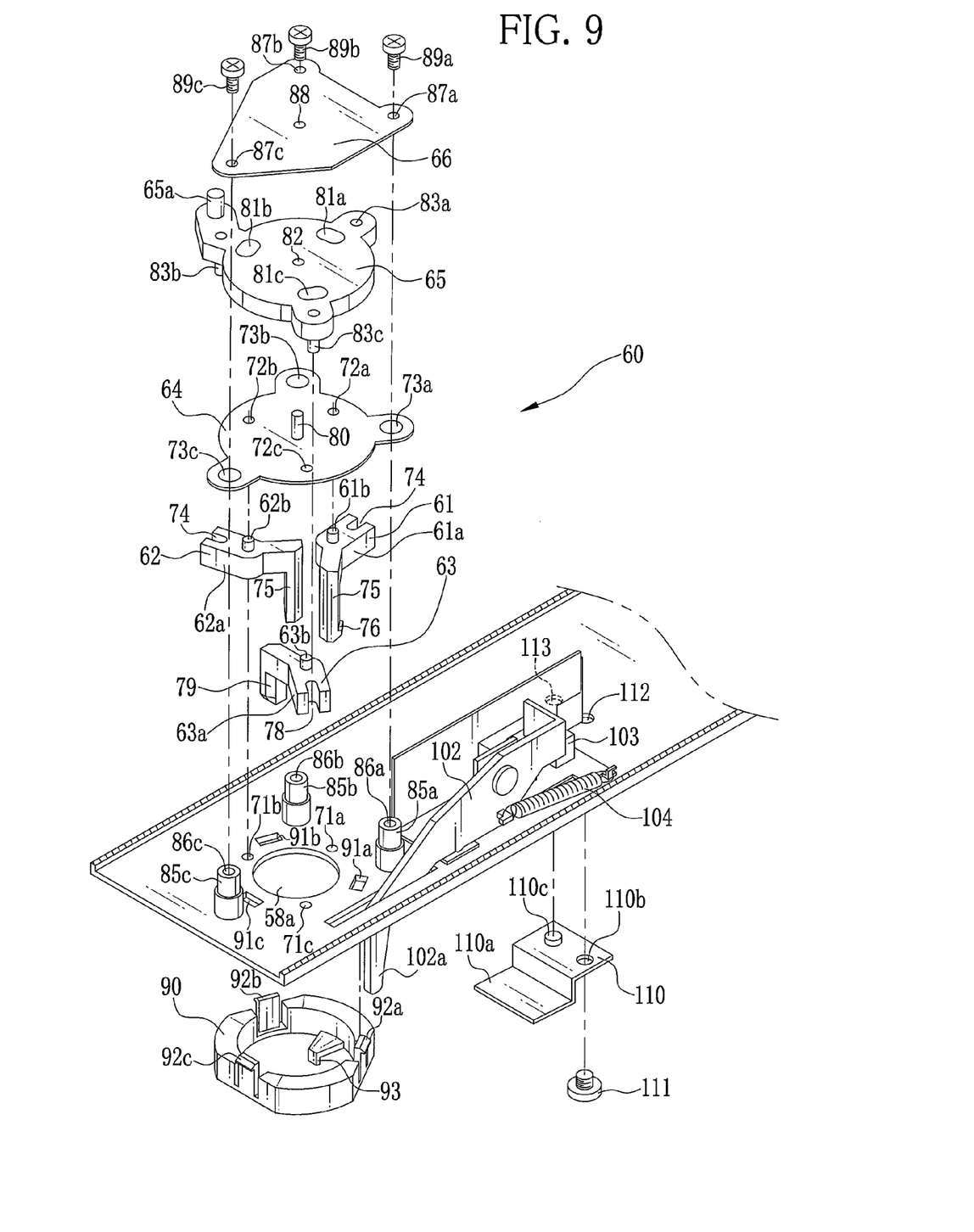
FIG. 9 is an exploded perspective view illustrating a disk holding device.
Figure 10:
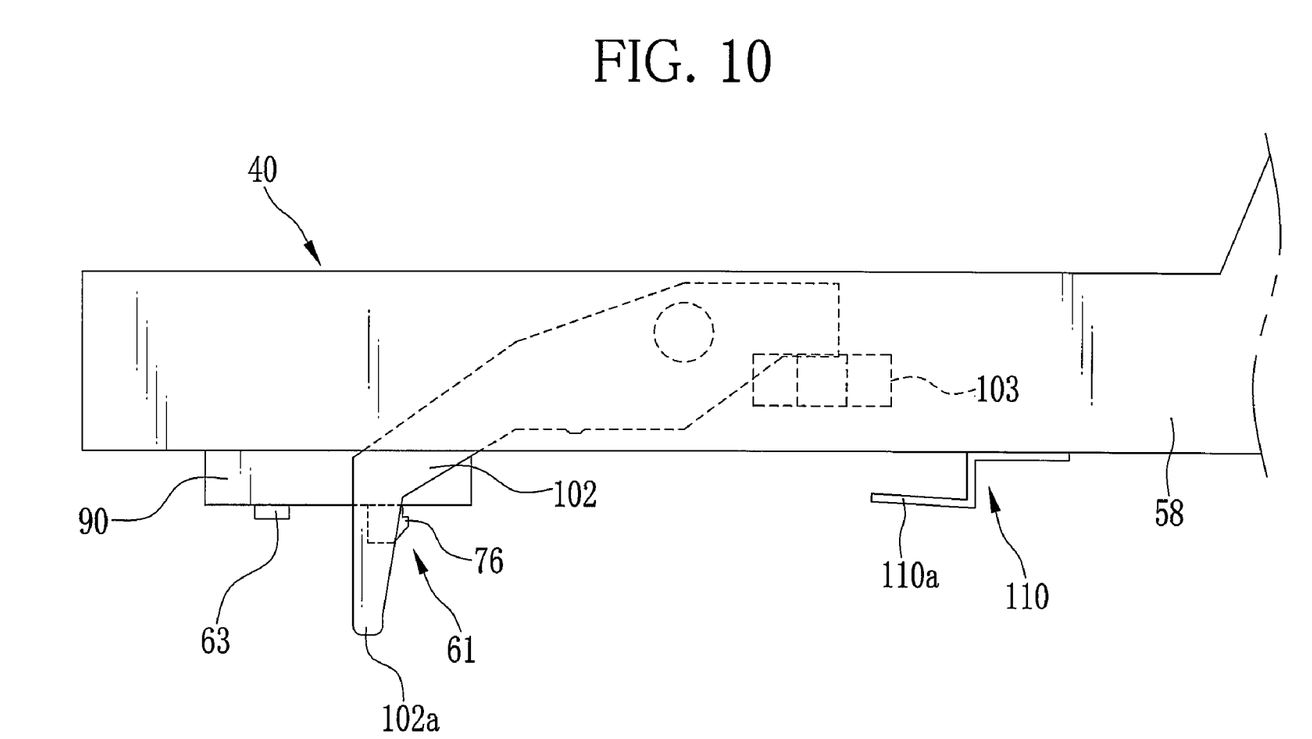
FIG. 10 is a side elevation illustrating the transfer arm in a release position.

In FIGS. 8, 9 and 10, the disk holding mechanism 60 includes coupling levers 61, 62 and 63 or chuck levers, a stationary plate 64 for support, a rotating plate 65, and a cover plate 66 for retention. The coupling levers 61-63 or shaft mechanism holds the disk D. The stationary plate 64 is a basis on which the coupling levers 61-63 are rotatable. The rotating plate 65 in an actuating mechanism rotates the coupling levers 61-63. The cover plate 66 covers the rotating plate 65. The coupling lever 62 has the same shape as the coupling lever 61.

The coupling levers 61-63 have lever arms 61a, 62a and 63a. Pivots 61b, 62b and 63b are formed to project from upper and lower surfaces of respectively the lever arms 61a, 62a and 63a. Connection holes 71a, 71b and 71c are formed in the transfer arm 58. Connection holes 72a, 72b and 72c are formed in the stationary plate 64. The pivots 61b-63b are inserted in the connection holes 71a-71c and the connection holes 72a-72c. The coupling levers 61-63 rotate about respectively the pivots 61b-63b.

Figure 11A:
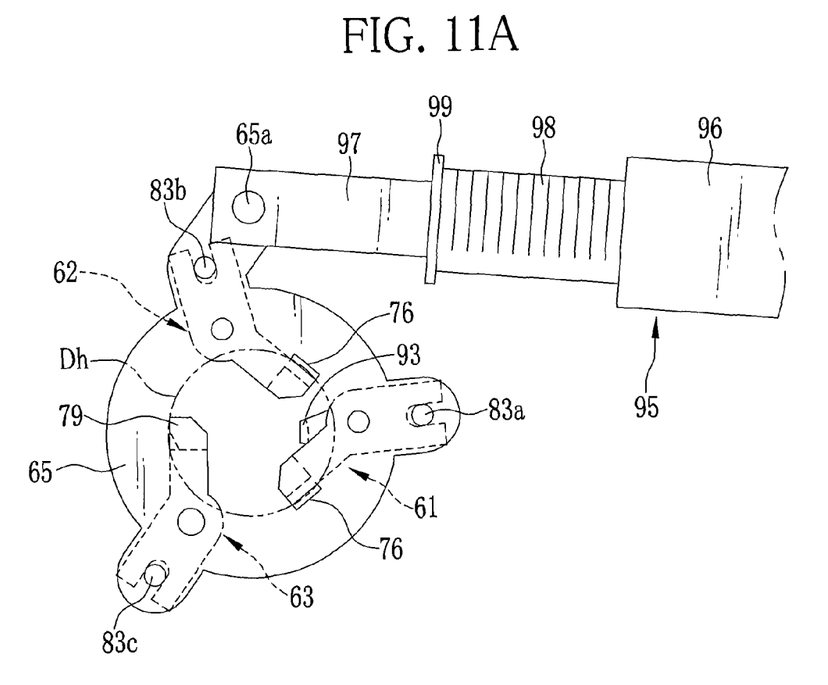
FIG. 11A is an explanatory view in a plan illustrating the coupling levers, the rotating plate and the solenoid.
Figure 11B:
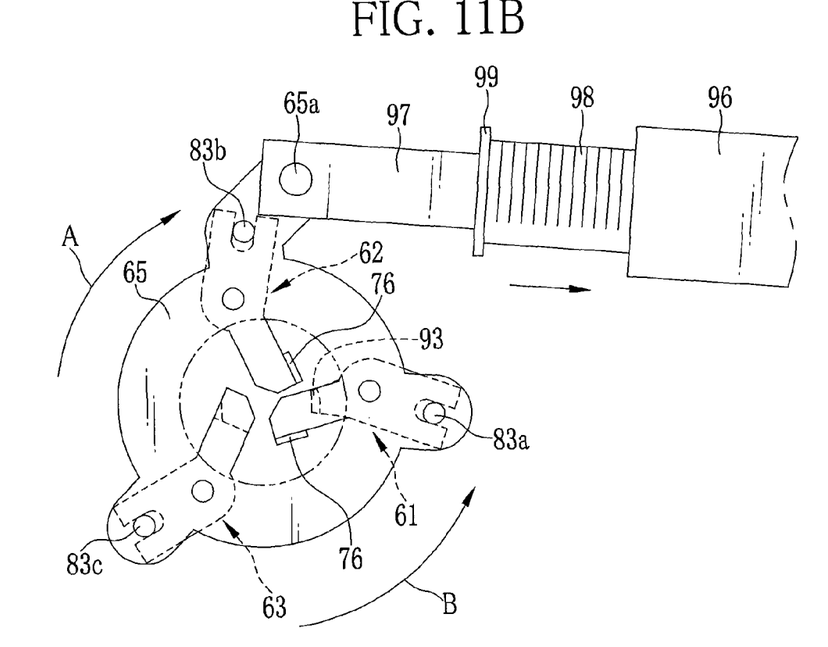
FIG. 11B is an explanatory view in a plan illustrating the same as FIG. 11A but in the release position.

Cutouts 74 or channels are formed in the coupling levers 61 and 62 at first ends of the lever arms 61a and 62a for linking with the rotating plate 65. Shank portions 75 are formed at second ends of the lever arms 61a and 62a, and inserted in the center hole Dh of the disk D. Hook portions 76 or hook jaws are formed with ends of the shank portions 75 for contacting a lower surface of an edge of the center hole Dh to hold the disk D. The coupling levers 61 and 62 rotate between a holding position of FIGS. 11A and 13 and a release position of FIGS. 11B and 14. The coupling levers 61 and 62 when in the holding position engage the hook portions 76 with the edge of the center hole Dh for holding. The coupling levers 61 and 62 when in the release position disengage the hook portions 76 from the center hole Dh toward its center point, to release the disk D from holding.

The coupling lever 63 has a cutout 78 or channel and a shank portion 79. The cutout 78 is formed in an end of the lever arm 63a for coupling with the rotating plate 65. The shank portion 79 is inserted in the center hole Dh in the disk D for pressing the edge surface Df of the center hole Dh. No hook portion is included in the coupling lever 63, so that the coupling lever 63 rotates between a holding position (See FIG. 13) for pressing the edge surface Df with the shank portion 79 and a release position (See FIG. 14) for releasing the edge surface Df. There is a circular access opening 58a or through hole for receiving insertion of the shank portions 75 and 79.

A pivot pin 80 is formed to project from the stationary plate 64. The rotating plate 65 includes through holes 81a, 81b and 81c, an axial hole 82, and link pins 83a, 83b and 83c or drive pins. The through holes 81a-81c receive insertion of the pivots 61b-63b. The axial hole 82 receives insertion of the pivot pin 80. The link pins 83a-83c are inserted in the cutouts 74 and 78. The rotating plate 65 rotates together with the pivot pin 80.

Internally threaded bosses 85a, 85b and 85c are disposed to project from the transfer arm 58, and used for connection with the stationary plate 64. Connection holes 73a, 73b and 73c are formed in the stationary plate 64 and receive the bosses 85a-85c.

Threaded holes 86a, 86b and 86c are formed in respectively the bosses 85a-85c. Screws 89a, 89b and 89c are helically coupled with respectively the threaded holes 86a-86c. Through holes 87a, 87b and 87c are formed in the cover plate 66 for receiving insertion of respectively the screws 89a-89c.

An axial hole 88 is formed in the cover plate 66 for insertion of the pivot pin 80 of the stationary plate 64.

A holding ring portion 90 is fitted on a lower surface of the transfer arm 58, contacts an upper surface of the disk D, and retains the disk D in cooperation with the hook portions 76. The holding ring portion 90 includes retention claws 92a, 92b and 92c and a separating projection 93. Retaining openings 91a, 91b and 91c are formed in the transfer arm 58. The retention claws 92a-92c are inserted in respectively the retaining openings 91a-91c. The separating projection 93 contacts the edge surface Df, and separates the disk D from the hook portions 76 of the coupling levers 61 and 62. Note that a plurality of separating projections 83 may be used.

A solenoid 95 as an actuating mechanism is secured to the transfer arm 58 for rotating the rotating plate 65. The solenoid 95 includes a frame 96 or armature, and a movable plunger 97 disposed movably inside the frame 96. A pivot pin 65a for transmission is disposed on the rotating plate 65 and is inserted in a hole formed at an end of the plunger 97.

A compression coil spring 98 is disposed to receive insertion of the plunger 97. There is a spring connector 99 on which an end portion of the compression coil spring 98 is retained. The plunger 97 is biased by the compression coil spring 98 in a direction to protrude from the frame 96. When the solenoid 95 is turned on, the plunger 97 becomes set inside the frame 96 against the compression coil spring 98.

A hold detector 101 is secured to the transfer arm 58 or carriage. The hold detector 101 includes a disk detection lever 102, a photo interrupter 103 and a tension coil spring 104. The photo interrupter 103 is turned on and off by shifting of the disk detection lever 102.

An insertion slot 58b is formed in the transfer arm 58. A detectable lever end 102a of the disk detection lever 102 is inserted in the insertion slot 58b, protrudes from a lower surface of the transfer arm 58, and detects an upper surface of the disk D. There are a bracket 106 and a pivot 107 with which the disk detection lever 102 is kept movable pivotally on the transfer arm 58. The tension coil spring 104 has a first end connected with the disk detection lever 102 and a second end connected with the bracket 106. The tension coil spring 104 biases the disk detection lever 102 to direct the lever end 102a downwards. The photo interrupter 103 is secured to the bracket 106.

A deskewing segment 110 is attached to a lower surface of the transfer arm 58, contacts a peripheral part of the disk, for preventing skew of the disk D in holding with the coupling levers 61-63 as shaft mechanism. The deskewing segment 110 is disposed behind the coupling lever 61. A contact portion 110a of the deskewing segment 110 for contacting the disk D is inclined upwards in a distal direction. The deskewing segment 110 includes a through hole 110b and a positioning pin 110c. A screw 111 is inserted in the through hole 110b. The transfer arm 58 includes a threaded hole 112 and a positioning hole 113. The threaded hole 112 is helically coupled with the screw 111 inserted therein after passing the through hole 110b. The positioning hole 113 receives insertion of the positioning pin 110c.

In FIG. 7, the moving mechanism 56 includes a frame 121, a rail rod 122 for guiding, an endless belt 123 and a stepping motor 124. The frame 121 and the rail rod 122 extend in a vertical direction. An upper plate 129 is fitted on upper ends of the frame 121 and the rail rod 122. A shaft 129a projects from the upper plate 129, and is supported on the frame 15 in a rotatable manner.

A first pulley 125a is disposed at a lower end of the frame 121 in a rotatable manner. The stepping motor 124 is disposed at an upper end of the frame 121. A second pulley 125b is connected with an output shaft of the stepping motor 124 in a rotatable manner. The endless belt 123 extends to contact on the periphery of the pulleys 125a and 125b. There are a guide sleeve 126 or carriage sleeve and guide rollers 127 with which the disk holding device 40 is secured to the rail rod 122 and the frame 121 in a manner movable up and down. The endless belt 123 is turned for circulation back and forth by the stepping motor 124. The disk holding device 40 is secured firmly to the endless belt 123. When the stepping motor 124 rotates forwards, the disk holding device 40 moves up. When the stepping motor 124 rotates backwards, the disk holding device 40 moves down.

Figure 4:
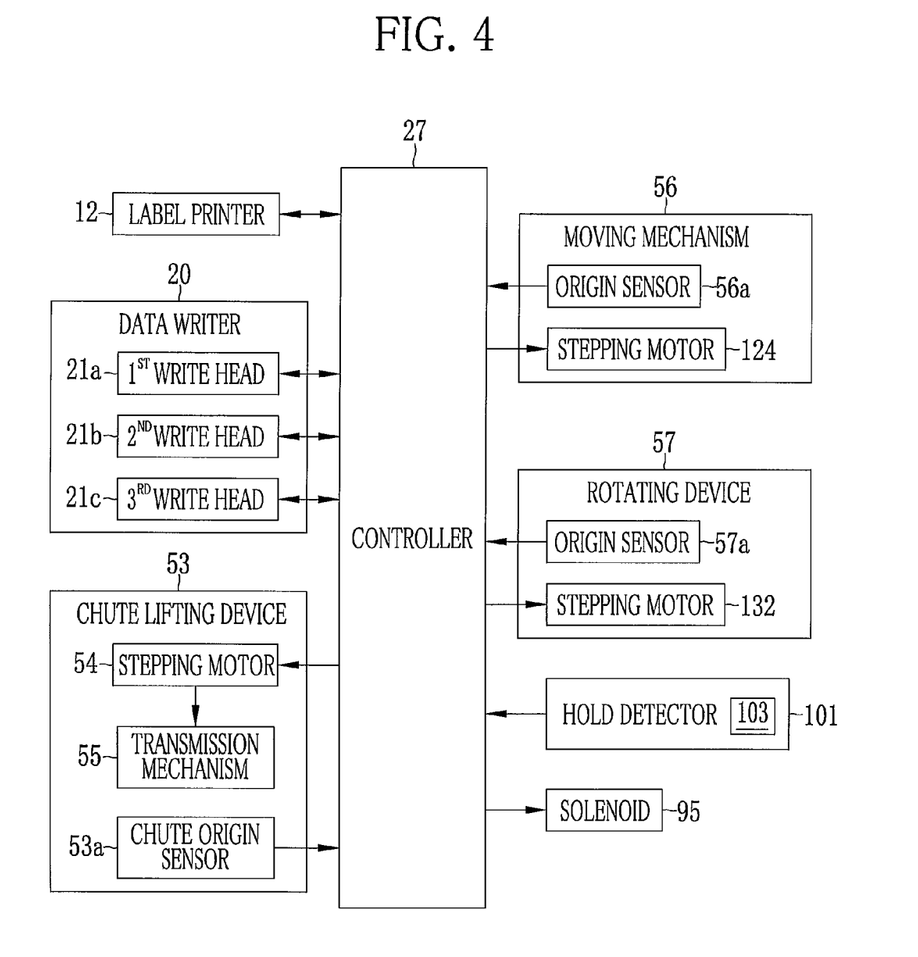
FIG. 4 is a block diagram schematically illustrating the disk processor.

In FIG. 4, an origin sensor 56a is disposed on the moving mechanism 56 for detecting a vertical position of the disk holding device 40. The number of pulses of the stepping motor 124 is controlled by referring to an original position generated by the origin sensor 56a. The disk holding device 40 can be stopped in any desired vertical position.

The rotating device 57 rotationally shifts the disk holding device 40 and the moving mechanism 56 about the shaft 129a of the upper plate 129 in a limited angular range, for example 90 degrees. The rotating device 57 includes a rotary support 131 and a stepping motor 132. The rotary support 131 supports a lowest part of the frame 15. The stepping motor 132 rotates the rotary support 131. Lower ends of the frame 121 and the rail rod 122 are attached to the rotary support 131.

In FIG. 4, an origin sensor 57a is disposed on the rotating device 57 for detecting an original position of the rotary support 131. The number of pulses of the stepping motor 132 is controlled according to the original position generated by the origin sensor 57a. The center of the group of the coupling levers 61-63 of the disk holding device 40 is set in selected positions, which are a stacking position at the centers of the disk stackers 37, 39 and 47 (FIG. 5), and the chute position (FIG. 6) defined by the upper surface of the chute structure 52 and centers of the tray 12a and the trays 22a-22c set in the open position.

In FIGS. 2, 3 and 5, the sorter body 51 includes a sorter frame 135 and the five sorting trays 28. The sorter frame 135 has a channel shape as viewed in a cross section. The sorting trays 28 are arranged in a multi-level arrangement within the sorter frame 135, and inclined downwards toward their front tray end. Support shafts 136 project from each rear portion of the sorting trays 28. Inside the sorter frame 135, the support shafts 136 support the sorting trays 28 in a pivotally movable manner. Lateral ridges 28a are formed on the sorting trays 28 for preventing drop with slip of a disk D.

A stationary sorting tray 138 is disposed in the sorter body and under the lowest one of the sorting trays 28. The stationary sorting tray 138 is used for discharging an unacceptable disk D after failure of printing, data writing or the like.

The chute structure 52 is disposed behind the sorter body 51. A pair of guide rods 141 are disposed to keep the chute structure 52 movable up and down. Edge guide ridges 52a project from edge portions of the chute structure 52, and prevent a disk D from dropping laterally.

In FIG. 4, a chute lifting device 53 moves the chute structure 52 up and down. The chute lifting device 53 includes a stepping motor 54, a transmission mechanism 55, and a chute origin sensor 53a. The transmission mechanism 55 includes a belt, pulleys and the like, and converts rotation of the stepping motor 54 into straight motion to move the chute structure 52. The chute origin sensor 53a detects that the chute structure 52 is in an original position (indicated by the solid line of FIG. 3) for drop of the disk D on the stationary sorting tray 138. The number of pulses of the stepping motor 54 is controlled with reference to the original position of an output of the chute origin sensor 53*a*, to stop the chute structure 52 in a designated position.

The operation of the above construction is described. The disk processor 10 is connected with a personal computer. A computer program or software is installed in the computer, and executed to control the disk processor 10 for data writing and label printing. The controller 27 is caused by the computer to control the various constituents in a sequential manner. Note that it is possible to install a computer program in the controller 27 for the same control without control by the computer.

At first, an unprocessed disk D is set in the first disk storage unit 33. A power source of the disk processor 10 is turned on. The disk holding device 40 is in a ready position (See FIG. 5) allowing delivery of the disk D from the first disk stacker 37. The computer generates a command signal of data writing and label printing. The solenoid 95 is turned on, before the disk holding device 40 moves down. As the solenoid 95 is turned on, the plunger 97 shifts into the frame 96 against the compression coil spring 98 from a state of FIG. 11A to a state of FIG. 11B. This causes the rotating plate 65 to rotate in the direction A. The coupling levers 61-63 are caused to rotate from the holding position to the release position.

Figure 12A:
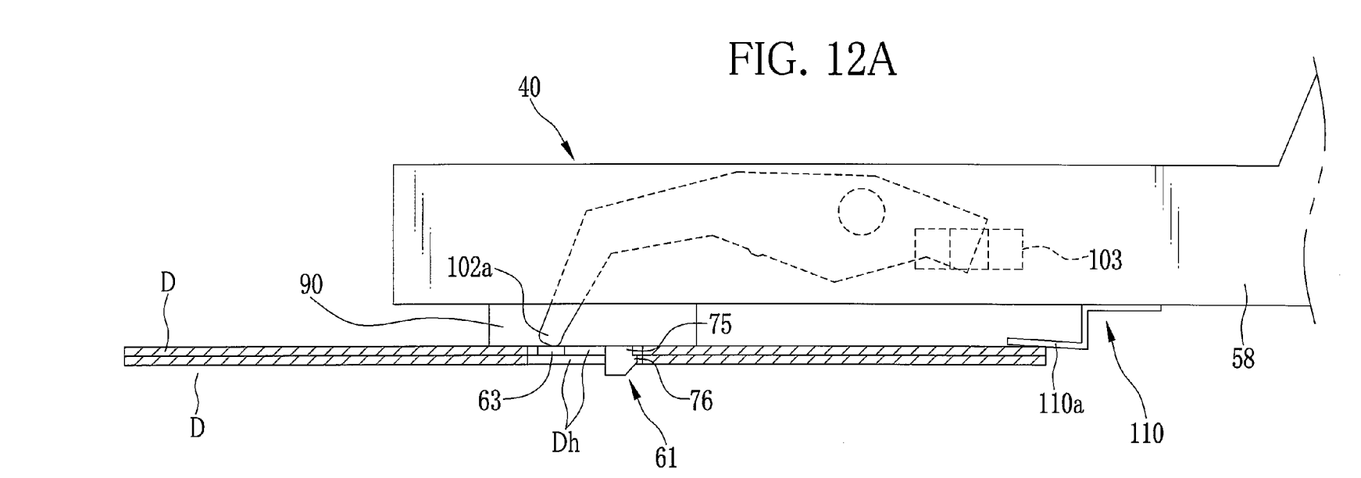
FIG. 12A is an explanatory view in a cross section illustrating the transfer arm.

In FIG. 12A, the disk holding device 40 moves down. The coupling levers 61-63 as shaft mechanism are entered in the center hole Dh of the disk D. The lever end 102*a* of the disk detection lever 102 contacts an upper surface of the disk D. The disk detection lever 102 is shifted pivotally in an upward direction. When the rotation is detected by the photo interrupter 103, a hold signal is input to the controller 27. In response, the controller 27 turns off the solenoid 95.

Figure 12B:
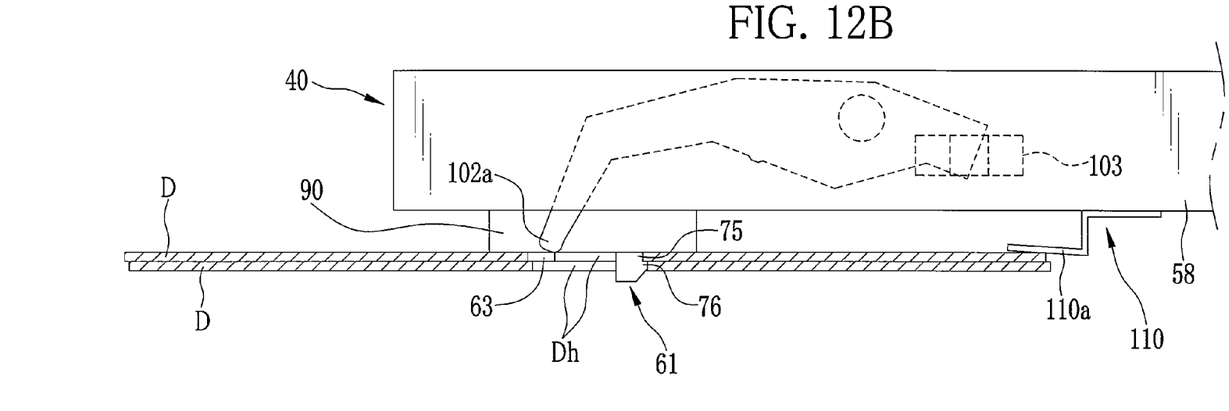
FIG. 12B is an explanatory view in a cross section illustrating the transfer arm after the disk holding.
Figure 13:
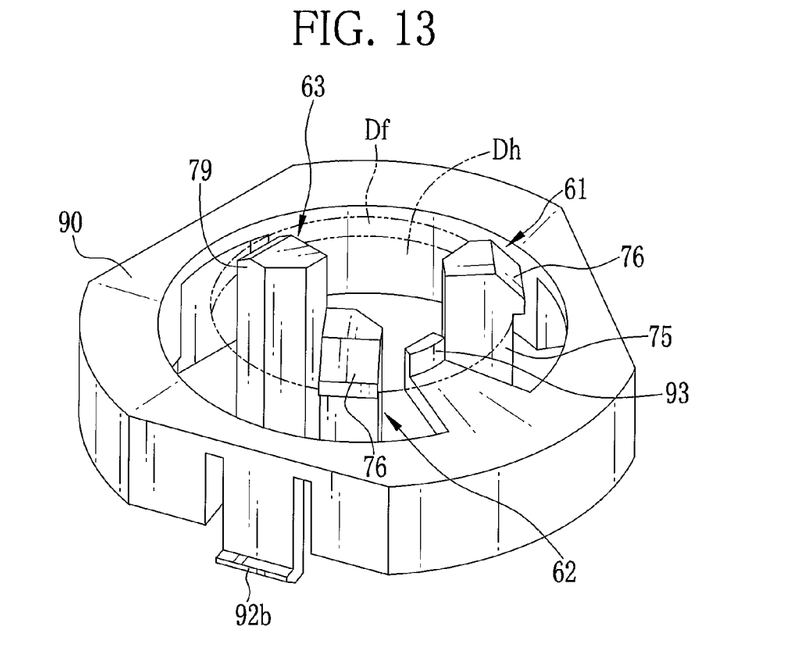
FIG. 13 is a bottom perspective view illustrating the coupling levers.

In FIGS. 12B and 13, the solenoid 95 is turned off. The coupling levers 61-63 rotate from the release position to the holding position. The hook portions 76 or hook jaws of the coupling levers 61 and 62 become engaged with a lower edge of the center hole Dh. The shank portions 75 contact its edge surface Df. The shank portion 79 of the coupling lever 63 presses the edge surface Df. The disk D is held by the coupling levers 61-63, and held between the holding ring portion 90 and the hook portions 76. The coupling lever 63 has not entered the center hole Dh of the second disk D upon engagement of the hook portions 76 with the lower surface of the first disk D. The hook portions 76 press the edge surface Df of the second disk D. Thus, the two disks D are not simultaneously engaged with the hook portions 76.

The disk holding device 40 holding the disk D moves up and then rotates to the chute position of FIG. 6. While the disk holding device 40 moves up, a first one of the disks D held thereon is separated from a second one of those directly under the first.

A peripheral portion of the disk D opposite to the coupling lever 63 contacts the contact portion 110*a* of the deskewing segment 110. The disk D can be kept on the coupling lever 63 without skew even when shock occurs to the disk processor 10 for separation of the disk or during shift of the disk. The contact portion 110*a* contacts only the peripheral surface of the disk D and does not scratch or damage an upper surface or label surface of the disk D.

The disk holding device 40, after rotating to the chute position, moves down to a separation position which is defined slightly higher than the tray 22*a* of the DVD write head 21*a*. Upon the reach of the disk holding device 40 to the separation position, the solenoid 95 is turned on for a predetermined period. In response, the coupling levers 61-63 are rotated from the holding position to the release position. The disk D is released from holding, separated from the disk holding device 40 and dropped down on the tray 22*a*.

Figure 14:
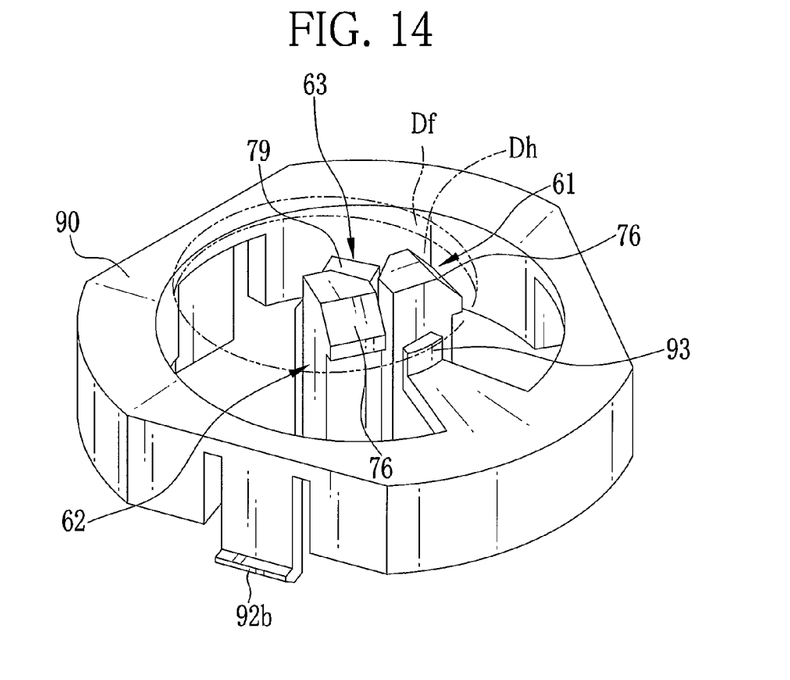
FIG. 14 is a bottom perspective view illustrating the same as FIG. 13 but in the release position.

In FIG. 14, the disk D is likely to rotate together with the hook portions 76 when the coupling levers 61 and 62 rotate from the holding position toward the release position. However, the disk D is prevented from moving by contact of the edge surface Df of the center hole Dh with the separating projection 93 of the holding ring portion 90. The disk D will not be released or dropped in a skewed state, because the hook portions 76 can come away reliably from the lower surface of the disk D.

The disk holding device 40 moves down, and transfers an unprocessed disk D to the tray 22*a*. Then the tray 22*a* comes to the closed position. The DVD write head 21*a* writes data to the disk D. Similarly, each one of the DVD write heads 21*b* and 21*c* is loaded with an unprocessed disk D in the same steps.

When the data writing is terminated, the tray 22*a* is controlled by the controller 27 to move to the open position. The controller 27 moves the disk holding device 40 to the position of the DVD write head 21*a*, and generates a command signal to hold the processed disk D on the tray 22*a* after the data writing. The disk holding device 40 holding the processed disk D is moved to a position of the label printer 12, where the disk D is dropped down to the tray 12*a* in its open position. The tray 12*a* receives the transfer of the disk D. After the transfer, the tray 12*a* becomes contained in the body of the label printer 12, where a label is printed on the disk D. The tray 12*a* is controlled by the controller 27 to come to the open position after the printing. The disk D becomes held on the disk holding device 40 in a printed form.

To stack the processed disks D in the third disk stacker 47, the disk holding device 40 shifts up and rotates to a position above the third disk stacker 47. A processed disk D is released from holding, and is dropped from the disk holding device 40 into the third disk stacker 47.

To advance the processed disk D in the sorting trays 28, the chute structure 52 moves higher than an uppermost one of the sorting trays 28. The disk holding device 40 moves down to a position slightly higher than the chute structure 52. The disk D is released from the holding. The disk D drops from the disk holding device 40, and is guided toward the uppermost sorting tray 28 through the chute structure 52. When the processed disk D is released from holding, the disk holding device 40 is moved up to the upper position. The chute structure 52 moves down to the initial position. Similarly, succeeding processed disks D are discharged in respectively the sorting trays 28.

Should failure occur, such as failure in the data writing or printing, then a failing disk D is discharged in the stationary sorting tray 138 in the lowest position without transfer into the sorting trays 28. This is for reliably separating the failing disk from processed disks.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk holding device for a disk having a center hole, comprising:

a disk holding mechanism for engagement with an edge of said center hole when in a holding position, and for coming away from said edge when in a release position, the disk holding mechanism comprising first, second and third coupling levers for engagement on at least three points of said edge, each of the first, second and third coupling levers comprising a shank portion for insertion in said center hole, the first and second coupling levers each further comprising a hook portion, disposed to project from said shank portion, for engagement of a lower surface of said disk, the third coupling lever without a hook portion;

an actuating mechanism for shifting said disk holding mechanism, to hold said disk by setting said disk holding mechanism in said holding position, and to enable loading or unloading of said disk by setting said disk holding mechanism in said release position; and a separator, opposed to said edge when inserted in said center hole, for receiving said edge while said disk holding mechanism moves to said release position, to ensure separation of said disk from said first and second coupling levers of said disk holding mechanism.

2. A disk holding device as defined in claim 1, further comprising:

a disk storage unit for containing said disk in a stacked manner;

a moving mechanism for moving said disk holding mechanism at least in an upward or downward direction, to remove said disk from said disk storage unit by one disk.

3. A disk holding device as defined in claim 2, wherein said first, second and third coupling levers couple with at least three points of said edge of said center hole and said hook portions of said first and second coupling levers retain said lower surface of said disk firmly.

4. A disk holding device as defined in claim 3, wherein said separator is disposed between said first and second coupling levers.

5. A disk holding device as defined in claim 3, further comprising a transfer arm for supporting said disk holding mechanism and for moving by operation of said moving mechanism;

wherein each of said first, second and third coupling levers includes a lever arm, disposed to project from an edge of said shank portion, and secured to said transfer arm in a rotatable manner.

6. A disk holding device as defined in claim 5, wherein said actuating mechanism includes:

an electromagnetic actuator; and a rotating plate, secured to an end of said lever arm, rotated by said actuator, for shifting said first, second and third coupling levers between said holding position and said release position.

7. A disk holding device as defined in claim 5, further comprising a holding ring portion, having an annular shape, disposed to project from a lower wall of said disk holding mechanism, for contacting a portion of said disk about said center hole;

wherein said separator is a separating projection disposed to project from an inner edge of said holding ring portion.

8. A disk holding device as defined in claim 5, further comprising an access opening formed in a lower wall of said transfer arm, opposed to said center hole, for receiving insertion of said shank portion of said first, second and third coupling levers.

9. A disk processor for a disk having a center hole, comprising:

a disk holding mechanism for engagement with an edge of said center hole when in a holding position, and for coming away from said edge when in a release position, the disk holding mechanism comprising first, second and third coupling levers for engagement on at least three points of said edge, each of the first, second and third coupling levers comprising a shank portion for insertion in said center hole, the first and second coupling levers each further comprising a hook portion, disposed to project from said shank portion, for engagement of a lower surface of said disk, the third coupling lever without a hook portion;

an actuating mechanism for shifting said disk holding mechanism, to hold said disk by setting said disk holding mechanism in said holding position, and to enable loading or unloading of said disk by setting said disk holding mechanism in said release position;

a separator, opposed to said edge when inserted in said center hole, for receiving said edge while said disk holding mechanism moves to said release position, to ensure separation of said disk from said first and second coupling levers of said disk holding mechanism;

a transfer arm for supporting said disk holding mechanism, said actuating mechanism and said separator;

a disk storage unit for containing an unprocessed disk;

a disk processing unit for processing said unprocessed disk in at least one of data writing and label printing;

a processed disk storage unit for containing said processed disk; and a moving mechanism for moving said transfer arm rotationally and in an upward or downward direction, to transfer said unprocessed disk from said disk storage unit to said disk processing unit, and to transfer said processed disk from said disk processing unit to said processed disk storage unit.

* * * * *